US011970383B2

(12) United States Patent
Cleland et al.

(10) Patent No.: US 11,970,383 B2
(45) Date of Patent: Apr. 30, 2024

(54) POST-MIXING CARBONATION OF BEVERAGES

(71) Applicant: Cleland Sales Corporation, Los Alamitos, CA (US)

(72) Inventors: James M Cleland, Los Alamitos, CA (US); Adam Cleland, Los Alamitos, CA (US)

(73) Assignee: Cleland Sales Corporation, Los Alamitos, CA (US)

( * ) Notice: Subject to any disclaimer, the term of this patent is extended or adjusted under 35 U.S.C. 154(b) by 1040 days.

(21) Appl. No.: 16/041,714

(22) Filed: Jul. 20, 2018

(65) Prior Publication Data

US 2018/0327244 A1 Nov. 15, 2018

Related U.S. Application Data

(62) Division of application No. 15/176,092, filed on Jun. 7, 2016, now Pat. No. 10,053,350.

(51) Int. Cl.
*B67D 1/00* (2006.01)
*B67D 1/08* (2006.01)
(Continued)

(52) U.S. Cl.
CPC ......... *B67D 1/0016* (2013.01); *B67D 1/0021* (2013.01); *B67D 1/0057* (2013.01);
(Continued)

(58) Field of Classification Search
None
See application file for complete search history.

(56) References Cited

U.S. PATENT DOCUMENTS 3,608,779 A * 9/1971 Cornelius ................ A23G 9/20 426/477
3,969,531 A 7/1976 Cornelius
(Continued)

FOREIGN PATENT DOCUMENTS

GB 2424638 A 4/2006
WO WO-2012032543 A1 * 3/2012 ........... B67D 1/0003

OTHER PUBLICATIONS

Servend Ice & Beverage Dispensing Units; Technician's Handbook; Part No. STH14 9/10; Manitowoc Foodservice; 2010.
(Continued)

*Primary Examiner* — Elizabeth M Kerr
(74) *Attorney, Agent, or Firm* — Fish IP Law, LLP

(57) ABSTRACT

Methods and devices for dispensing a cooled beverage are provided. One embodiment of methods includes the steps of mixing a diluent and a concentrate to make a diluted solution. The diluted solution is carbonated to yield a carbonated solution. The carbonated solution is cooled to below 0° C. to produce the cooled beverage, and the cooled beverage is dispensed through a nozzle. A device for dispensing a cooled beverage, where the cooled beverage comprises a diluent having a freezing point at STP includes an upstream cooler that pre-cools a supply of diluent to a temperature above the freezing point. A mixer mixes the pre-cooled diluent with a concentrate to make a diluted solution. A downstream cooler further cools the diluted solution to below the freezing point. A dispenser dispenses the downstream-cooled solution to atmosphere. The temperature of the cooled beverage is below the freezing point when dispensed.

11 Claims, 7 Drawing Sheets

(51) Int. Cl.
*B67D 1/10* (2006.01)
*B67D 1/12* (2006.01)

(52) U.S. Cl.
CPC ......... *B67D 1/0058* (2013.01); *B67D 1/0068* (2013.01); *B67D 1/0859* (2013.01); *B67D 1/0884* (2013.01); *B67D 1/10* (2013.01); *B67D 1/1281* (2013.01); *B67D 1/0064* (2013.01); *B67D 1/0067* (2013.01); *B67D 1/0862* (2013.01); *B67D 2210/00104* (2013.01)

(56) References Cited

U.S. PATENT DOCUMENTS

| | | | | |
|---|---|---|---|---|
| 4,028,441 | A * | 6/1977 | Richards .............. G05D 7/0193 | 62/307 |
| 5,086,951 | A * | 2/1992 | Nakayama ............... B67D 1/08 | 222/129.1 |
| 5,156,871 | A * | 10/1992 | Goulet ................ B01F 23/2362 | 261/DIG. 7 |
| 5,564,601 | A * | 10/1996 | Cleland ..................... F28D 7/08 | 62/185 |
| 5,565,149 | A * | 10/1996 | Page .................... B67D 1/1252 | 261/DIG. 7 |
| 6,234,349 | B1 * | 5/2001 | Bilskie ................. B67D 1/0064 | 222/67 |
| 6,260,477 | B1 * | 7/2001 | Tuyls ...................... A23F 3/163 | 261/DIG. 7 |
| 6,576,276 | B1 | 6/2003 | Gupta et al. | |
| 6,604,654 | B2 | 8/2003 | Staten et al. | |
| 6,807,460 | B2 | 10/2004 | Black et al. | |
| 10,053,350 | B2 * | 8/2018 | Cleland .................... B67D 1/08 | 222/129.1 |
| 2003/0066306 | A1 * | 4/2003 | Renken ................ B67D 1/0857 | 62/390 |
| 2006/0021919 | A1 * | 2/2006 | Olson .................... B67D 1/004 | 210/85 |
| 2008/0073376 | A1 | 3/2008 | Gist et al. | |
| 2009/0211269 | A1 | 8/2009 | Gist et al. | |
| 2011/0042414 | A1 * | 2/2011 | Tachibana ............ B67D 1/0864 | 222/129.1 |
| 2011/0168735 | A1 * | 7/2011 | Van Zeeland ........ B67D 1/0057 | 222/394 |
| 2017/0042178 | A1 | 2/2017 | Black | |
| 2017/0064977 | A1 | 3/2017 | Bischel | |

OTHER PUBLICATIONS

IMI Cornelius (Tianjin) Co., Ltd.; Vanguard 245 Post-Mix Beverage Dispenser Service Manual (McDonald's Applications) 2006.

* cited by examiner

POST-MIXING CARBONATION OF BEVERAGES

CROSS REFERENCE TO RELATED APPLICATIONS

This application is a continuation of and claims priority to U.S. Utility application Ser. No. 15/176,092, entitled "Post-Mixing Carbonation of Beverages", filed Jun. 7, 2016, which is incorporated herein by reference.

FIELD OF THE INVENTION

The field of the invention is beverage dispensers.

BACKGROUND

Delivery of beverages to consumers is a basic problem for the beverage industry that has spawned various innovations. To deliver carbonated beverages to consumers, it is known to package the beverages in cans and bottles for individual or multiple serving sizes. However, high logistical costs for bottling, distributing, and storing billions of cans and bottles make high volume containers capable of point-of-sale distribution more desirable.

For carbonated or otherwise pressurized beverages, it is known in the art to deliver premixed beverages to dispensing locations in high volume rigid containers, such as kegs in general or Cornelius kegs in particular for premixed soft drinks. This is problematic because 1) supply chain efficiency is still low, and 2) it prevents an end user from customizing many aspects of the beverage, including content, concentration, and carbonation.

Many have tried to solve the problem by improving technology for mixing and carbonating beverages at the point-of-sale. For example, U.S. Pat. No. 6,260,477 to Tuyls discloses the use of carbon dioxide ($CO_2$) canisters or other carbonators to either carbonate a beverage or to carbonate an ingredient of the beverage, such as water. Tuyls's devices permit ingredients for a beverage (e.g., water, $CO_2$, concentrated flavoring or syrup, etc.) to be supplied independently to the point-of-sale, and improves supply chain efficiency. It also permits further customization of beverage composition by controlling the content, carbonation, and concentration of the mixed beverage. However, Tuyls's device is still limited such that customization of cooling temperature cannot be optimally controlled.

It is known in the art that cooling a beverage, or beverage ingredient, to a temperature below 0° C. generally results in a phase change from liquid to solid. This is a problem because such phase change can damage the dispensing device and may impede or completely prevent the dispensing of a beverage. However, such cooling is desirable for beverages intended to be consumed cold because subzero-cooled beverages provide a pleasurable "mouth feel" for consumers while avoiding the use of ice cubes, which ultimately melt and unfavorably dilute the beverage.

Many have tried to solve this problem by improving technology for cooling a beverage or its ingredients before dispensing. For example, G.B. Patent No. 2,424,638 to Kershaw discloses that beverages can be cooled to temperatures as low as 3° C. prior to dispensing. However, no currently available device allows the beverages to be cooled below 0° C.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is a need for devices and methods for cooling beverages, or beverage ingredients, to temperatures below 0° C. before dispensing the cooled beverage.

SUMMARY OF THE INVENTION

The inventive subject matter provides methods, apparatus, devices, systems, kits, and compositions for dispensing a cooled beverage.

One inventive subject matter includes a method of dispensing a cooled beverage. In some embodiments, the method includes a step of the mixing a diluent and a concentrate to make a diluted solution. The diluted solution is then carbonated to yield a carbonated solution. The carbonated solution can then be cooled to below 0° C. to produce the cooled beverage, and subsequently dispensed through a nozzle.

In some embodiments, an additive can also be added. The additive can be added at various points of the inventive method and to various solutions, including the diluent, the concentrate, the diluted solution, the carbonated solution, or the cooled beverage. The additive can be a flavor to add taste, a scent to add smell, a color to add appearance, a thickener to add texture, or a stabilizer to modify phase properties of the ingredients of the inventive method.

It is contemplated that the diluent can be pre-cooled before it is mixed with the concentrate. Pre-cooled diluent can be recirculated in a cooling system to maintain a target temperature, and can also be stored in a tank, which can be further cooled or insulated.

The methods of the inventive subject matter can further include a step of using an evaporator to remove gas from the diluted solution. Evaporators typically have a semi-permeable membrane to allow gases in the diluted solution to escape during or after mixing.

In some embodiments, a step of mixing can be performed by mixers appropriate for mixing fluids. In these embodiments, a pump can be disposed downstream of the mixer to propel the diluted solution into a carbonator. A vacuum valve can also be disposed between the pump and the carbonator. The vacuum valve is configured to prevent fluid in the carbonator from flowing toward the mixer when the pump is not operating.

The diluted solution can be carbonated in a carbonator, and can be cooled while resident in the carbonator. Cooling the carbonated solution may be accomplished by passing the carbonated solution through a cold plate. Such cold plate can also be used to cool the carbonator. In some embodiments, the carbonated solution is passed through a cold plate before dispensing. In preferred embodiments, the temperature of the carbonated solution is measured by a sensor while the carbonated solution is resident in a cold plate.

Another inventive subject matter includes a device for dispensing a cooled beverage. The cooled beverage includes a diluent with a freezing point at standard temperature and pressure ("STP") conditions. The device includes an upstream cooler, a downstream cooler, a mixer, and a dispenser. The upstream cooler pre-cools some of the diluent to a temperature above the freezing point. A mixer mixes the pre-cooled diluent with a concentrate to make a diluted solution. A downstream cooler further cools the diluted solution to below the freezing point. A dispenser dispenses the downstream-cooled solution to the atmosphere as the cooled beverage. In preferred embodiments, the cooled beverage has a temperature below the freezing point when it is dispensed to the atmosphere.

In some embodiments, the device includes a tank, which temporarily holds the pre-cooled diluent. Optionally, the device also includes a carbonator that can be disposed between the mixer and the downstream cooler, and can be cooled by the downstream cooler. Alternatively, or in combination, the carbonator is cooled by an intermediate cooler. The downstream cooler can be a cold plate or any other suitable device. Preferred embodiments include electronics that maintain the cooled beverage within a range of no more than ±5° C. from the target temperature, and preferably within ±3° C.

DETAILED DESCRIPTION

Figure 1:
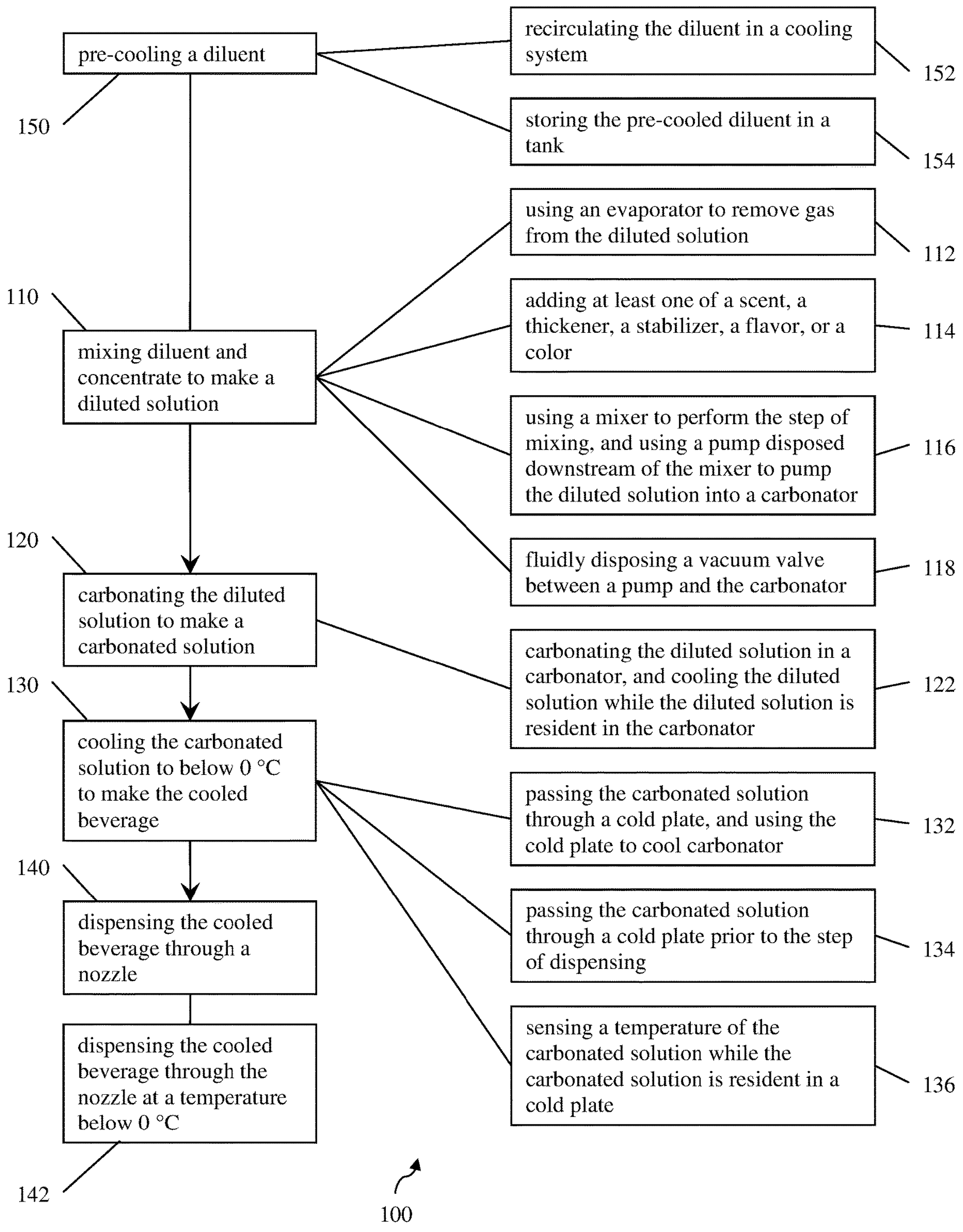
FIG. 1 is a flow chart for a method of dispensing a cooled beverage.

The inventive subject matter provides methods, apparatus, devices, systems, kits, and compositions for dispensing a cooled beverage, at or about 0° C., and preferably below 0° C.

The inventive subject matter includes a device for dispensing a cooled beverage. One embodiment is the dispenser system 200 illustrated in FIG. 2. The dispenser system 200 includes upstream cooler 230, mixer 240, downstream cooler 250, and dispenser 260. Upstream cooler 230 is fluidly coupled to diluent supply 210 and mixer 240. Mixer 240 is further fluidly coupled to concentrate supply 220 and downstream cooler 250. Downstream cooler 250 is further fluidly coupled to dispenser 260.

In preferred embodiments, diluent supply 210 supplies water. However, diluent supply 210 can supply other diluents, alone or in combination, including wine, beer, spirits, liqueur, or fruit juice. In some embodiments, the water is provided by a municipal water line. In such embodiments, it is preferred that diluent supply 210 further comprises a filtering apparatus to remove contaminants from the water. Diluent supply 210 can also supply pre-treated water, including spring water, filtered water, purified water, mineral water, alkaline water, or distilled water. In some embodiments the supplied diluent (e.g., water provided by a municipal water line, etc.) may be pressurized. Diluent supply 210 can also include a pump for propelling diluent into upstream cooler 230, or may alternatively rely on gravity or negative pressure.

Concentrate supply 220 supplies a concentrate appropriate for mixing with a diluent to yield a beverage. In preferred embodiments, concentrate supply 220 supplies a syrup appropriate for producing a soft drink (e.g., Pepsi®, Mountain Dew®, etc.). Concentrate supply 220 can also supply fruit juice concentrate, fruit drink base, cocktail mix concentrate, tea concentrate, coffee concentrate, snow cone syrup, and isotonic beverage concentrate.

Concentrates (e.g., soft drink syrups, etc.) can be high in sugar content, low in sugar content, or sugar free. High sugar content concentrates typically have sugar concentrations (grams of sugar per liter of concentrate) of at least 450 g/L, 480 g/L, 510 g/L, 540 g/L, 570 g/L, 600 g/L, 620 g/L, 640 g/L, 660 g/L, 680 g/L, 700 g/L, 720 g/L, 740 g/L, 760 g/L, 780 g/L, 800 g/L, or 850 g/L. Low sugar content concentrates typically have sugar concentrations of no more than 350 g/L, 250 g/L, 200 g/L, 150 g/L, 120 g/L, 100 g/L, 80 g/L, 60 g/L, 40 g/L, or 20 g/L. "Sugar free" concentrates typically have sugar concentrations of no more than 15 g/L or 10 g/L.

Figure 2:
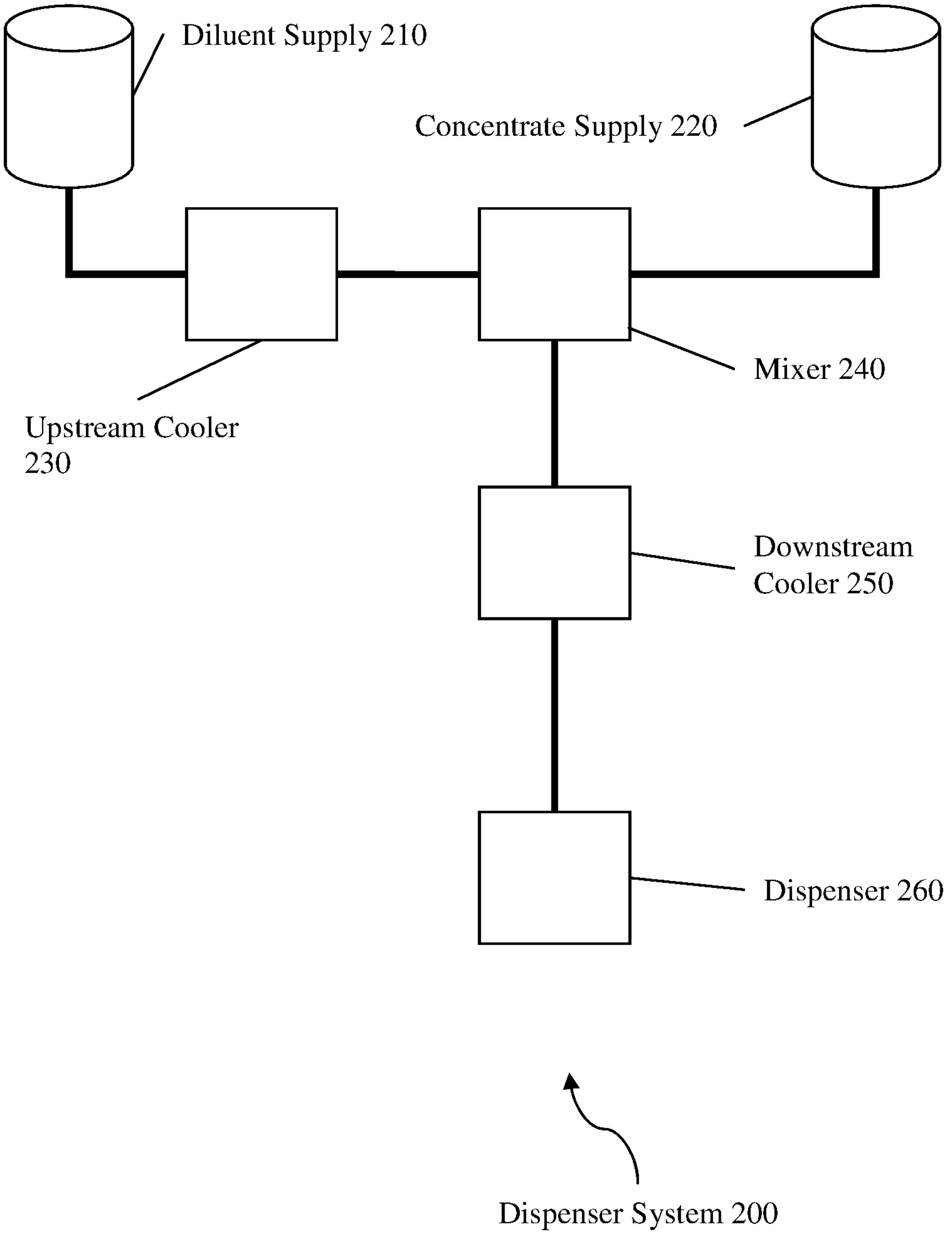
FIG. 2 is a schematic of a device for dispensing a cooled beverage.

Concentrate supply 220 delivers concentrate to the system via any suitable sources (e.g., canisters, tubes, cartridges, pressurized vessels, bladders, a bag-in-a-box, etc.). Concentrate supply 220 can be self-pressurized (e.g., pressurized vessel), pressurized by a pump, or can rely upon gravity to propel the concentrate into mixer 240. In FIG. 2, dispenser system 200 depicts a single concentrate supply 220, but it is contemplated that more than one concentrate supply 220, as well as a single concentrate supply 220 capable of supplying more than one concentrate, be included.

Upstream cooler 230 is disposed downstream of diluent supply 210 and upstream of mixer 240. Upstream cooler 230 receives diluent, and includes a tank for holding and cooling the diluent before the diluent is delivered to mixer 240. Upstream cooler 230 cools diluent by any suitable means (e.g., a cold plate, a coolant jacket, a coolant coil, etc.). Upstream cooler 230 can cool the diluent to below 25° C., preferably below 15° C., or more preferably below 10° C. In some embodiments, upstream cooler 230 cools the diluent to between 0° C. and 5° C.

Mixer 240 is disposed downstream of both upstream cooler 230 and concentrate supply 220. Mixer 240 receives diluent and concentrate, and includes a mixing device for mixing fluids (e.g., agitators, ribbon blenders, paddle mixers, static mixers, inline mixers, homogenizers, emulsifiers, etc.). Mixer 240 mixes diluent and concentrate in specified ratios, including a 100:1 diluent:concentrate ratio. But ratios of about 80:1, 60:1, 40:1, 30:1, 20:1, 15:1, 10:1, 9:1, 8:1, 7:1, 6:1, 5.4:1, 5:1, 4.5:1, 4:1, 3.5:1, 3:1, 2.5:1, 2:1, 1.5:1, and 1:1 of diluent:concentrate, as well as inverse ratios, are also contemplated. In some embodiments, mixer 240 further comprises a metering device that is user-adjusted to deliver diluent and concentrate to a mixing chamber of mixer 240 in a specified ratio.

Diluted solutions can have high sugar content, low sugar content, or be approximately sugar free. Diluted solutions having high sugar content typically have sugar concentrations (grams of sugar per liter of diluted solution) of at least 75 g/L, 80 g/L, 85 g/L, 90 g/L, 95 g/L, 100 g/L, 103 g/L, 107 g/L, 110 g/L, 113 g/L, 117 g/L, 120 g/L, 123 g/L, 127 g/L, 130 g/L, 133 g/L, or 142 g/L. Diluted solutions having low sugar content typically have sugar concentrations of no more than 58 g/L, 42 g/L, 33 g/L, 25 g/L, 20 g/L, 17 g/L, 13 g/L, 10 g/L, 7 g/L, or 3 g/L. Diluted solutions that are approximately sugar free typically have sugar concentrations of no more than 2.5 g/L or 1.7 g/L.

After performing a mixing operation, mixer 240 produces a diluted solution. Viewed from another perspective, the input to mixer 240 is diluent and concentrate, and the output is a mixture of diluent and concentrate.

Downstream cooler 250 is disposed downstream of mixer 240 and upstream of dispenser 260. Downstream cooler 250 includes a tank for holding and cooling the diluted solution produced by mixer 240 before the diluted solution is delivered to dispenser 260. Downstream cooler 250 cools the diluted solution by any suitable means (e.g., a cold plate, coolant jacket, coolant coil, etc.) to a temperature below 10° C., preferably below 5° C., or more preferably below 0° C. In some embodiments, downstream cooler 250 cools the diluent to between −5° C. and 5° C. A pump can be disposed between mixer 240 and downstream cooler 250 to propel the diluted solution from mixer 240 toward downstream cooler 250.

Dispenser 260 is disposed downstream of downstream cooler 250. It is contemplated that dispenser 260 comprise a mechanism (e.g., nozzle, a tap, a spout, a soda gun, or a draft arm) for dispensing a cooled beverage to a consumer. Dispenser 260 can include a single dispensing mechanism for dispensing a single variety of cooled beverage, a single dispensing mechanism for dispensing multiple varieties of cooled beverages, or multiple dispensing mechanisms. Each mechanism can dispense a single or multiple varieties of cooled beverages.

Figure 3:
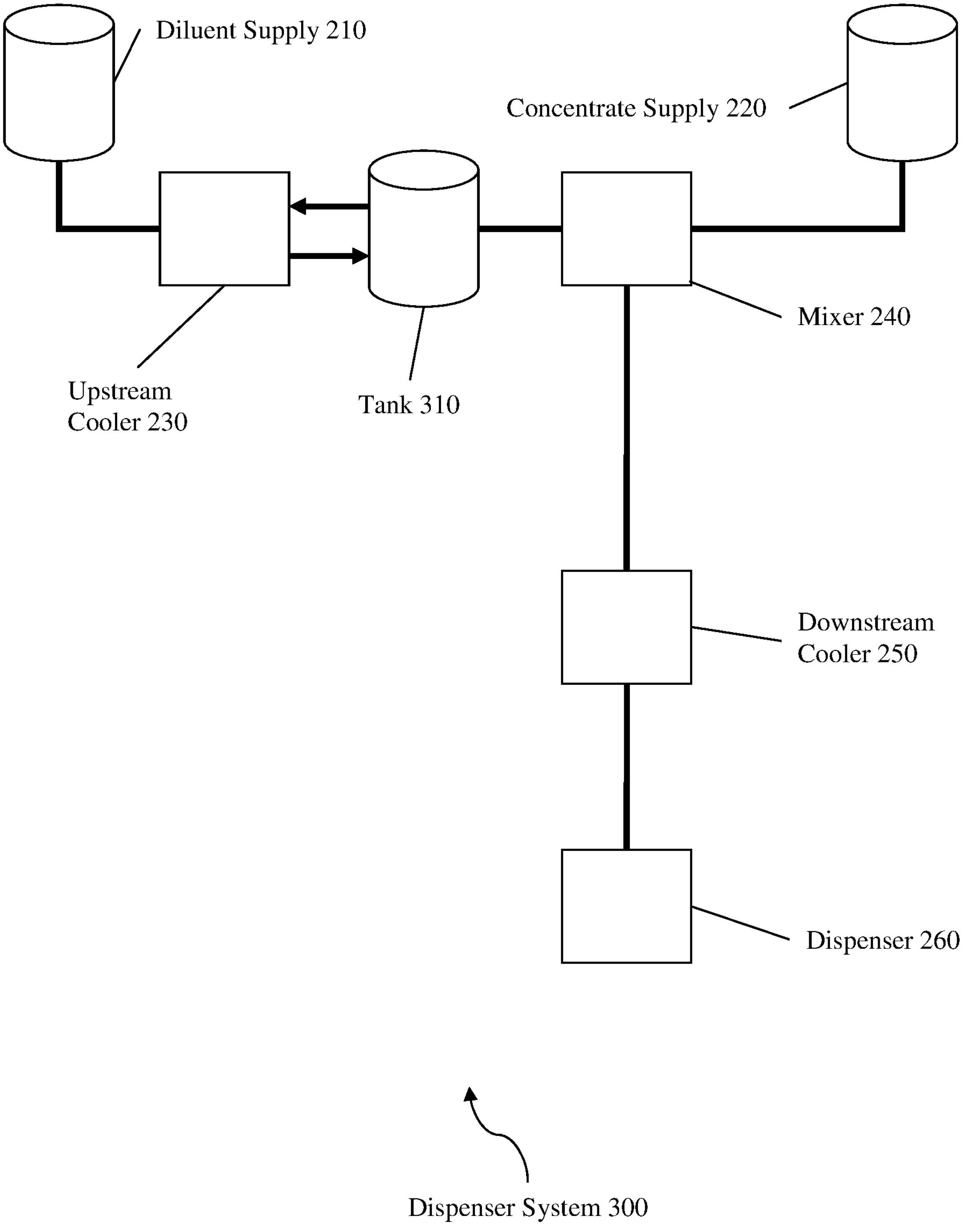
FIG. 3 is another schematic of a device for dispensing a cooled beverage.

FIG. 3 illustrates another dispenser system 300. Dispenser system 300 is similar to dispenser system 200, but further includes tank 310 disposed between upstream cooler 230 and mixer 240. All components having the same numbering as FIG. 2 are as described above.

Tank 310 has two couplings with upstream cooler 230. Tank 310 holds diluent that has been cooled by upstream cooler 230 until dispenser 260 is activated, and diluent is drawn from tank 310 into mixer 240. In some embodiments, an output coupling between tank 310 and upstream cooler 230 permits flow of diluent from tank 310 to upstream cooler 230. The diluent flowing from tank 310 to upstream cooler 230 typically has a temperature higher than the temperature of upstream cooler 230. An input coupling between upstream cooler 230 and tank 310 permits flow of diluent from upstream cooler 230 to tank 310. The diluent flowing from upstream cooler 230 to tank 310 typically has a temperature at least as low as upstream cooler 230.

Tank 310 can be configured such that, as a portion of diluent is at least 3° C. higher than the temperature of upstream cooler 230, the portion of diluent rises to the top of tank 310. In some embodiments, the output coupling for flow of diluent from tank 310 to upstream cooler 230 is positioned at the top of tank 310. This permits the portion of diluent at least 3° C. higher than the temperature of upstream cooler 230 to recirculate from tank 310 into upstream cooler 230.

Tank 310 also includes an output coupling to permit diluent to flow from tank 310 into mixer 240. In some embodiments, the output coupling from tank 310 to mixer 240 is positioned at the bottom of tank 310. This permits a portion of diluent with a temperature at least as low as the temperature of upstream cooler 230 to flow into mixer 240. Tank 310 can also include insulation to impede the transfer of heat into or out of tank 310.

Figure 4:
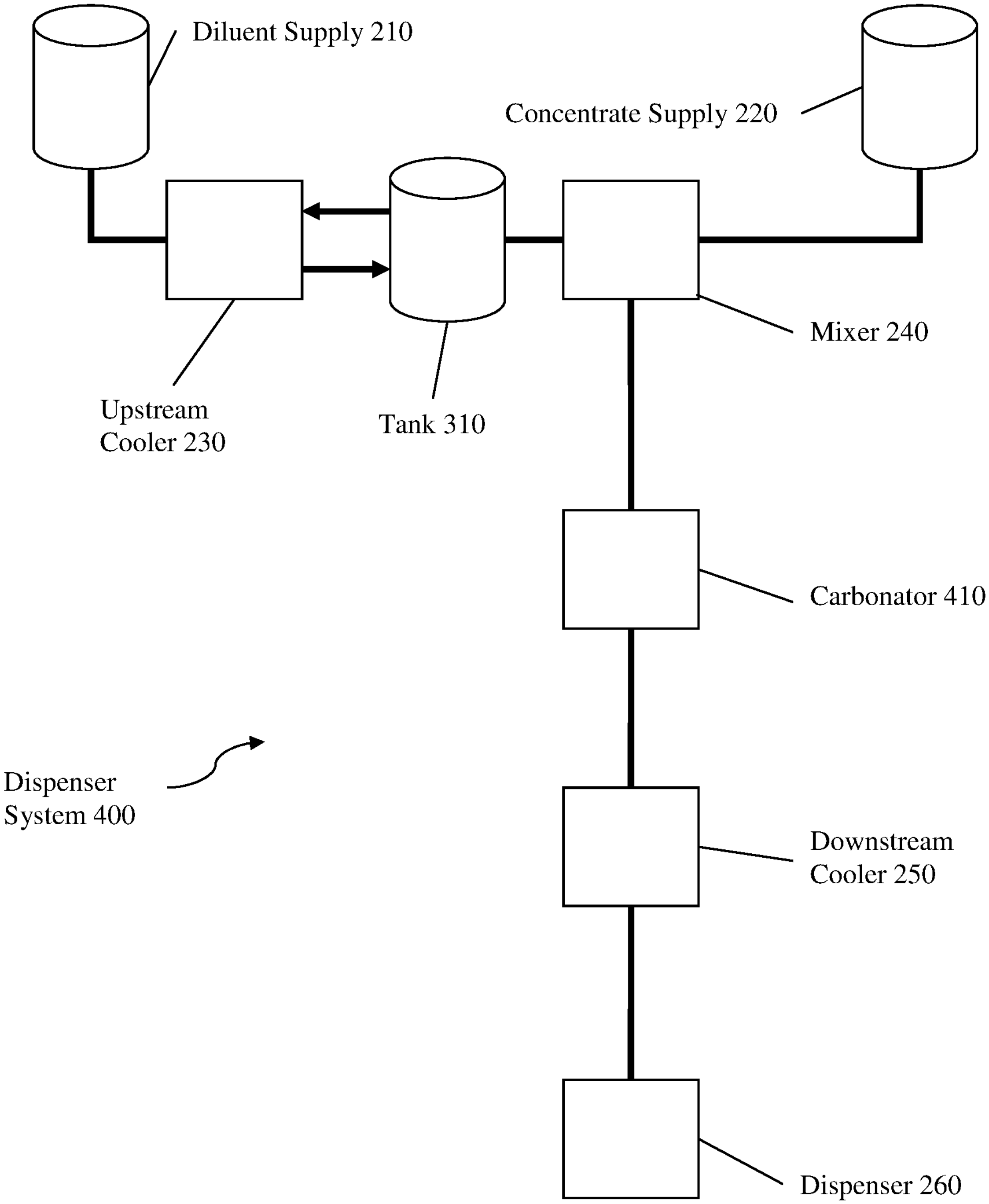
FIG. 4 is yet another schematic of a device for dispensing a cooled beverage.

FIG. 4 illustrates still another dispenser system 400. Dispenser system 400 is similar to dispenser system 300, but further includes carbonator 410 disposed between Mixer 240 and downstream cooler 250. All components having the same numbering as FIGS. 2 and 3 are as described above.

Carbonator 410 receives a diluted solution as input from mixer 240, performs a carbonation operation, and then outputs a carbonated beverage to downstream cooler 250. Any suitable devices for performing a carbonation operation may be used. For example carbonating tanks can be fluidly coupled with a source of pressurized $CO_2$ such that the $CO_2$ bubbles through a diluted solution resident in the carbonator (e.g., via a carbonator stone, etc.). In some embodiments, where either the concentrate or the diluted solution is low in sugar content or sugar free, it is contemplated that carbonator 410 be pressurized to at least 100 psi, 120 psi, 140 psi, 160 psi, 180 psi, 200 psi, 250 psi, or 300 psi. In some embodiments, carbonator 410 is cooled, and the diluted solution resident in carbonator 410 can also be cooled. Carbonator 410 may be cooled by a cold plate, a coolant jacket, a coolant coil, or other suitable means. In some embodiments, carbonator 410 can be cooled by downstream cooler 250.

Using essentially the same systems and methods, one could use a nitrogen-based gas instead of $CO_2$.

Figure 5:
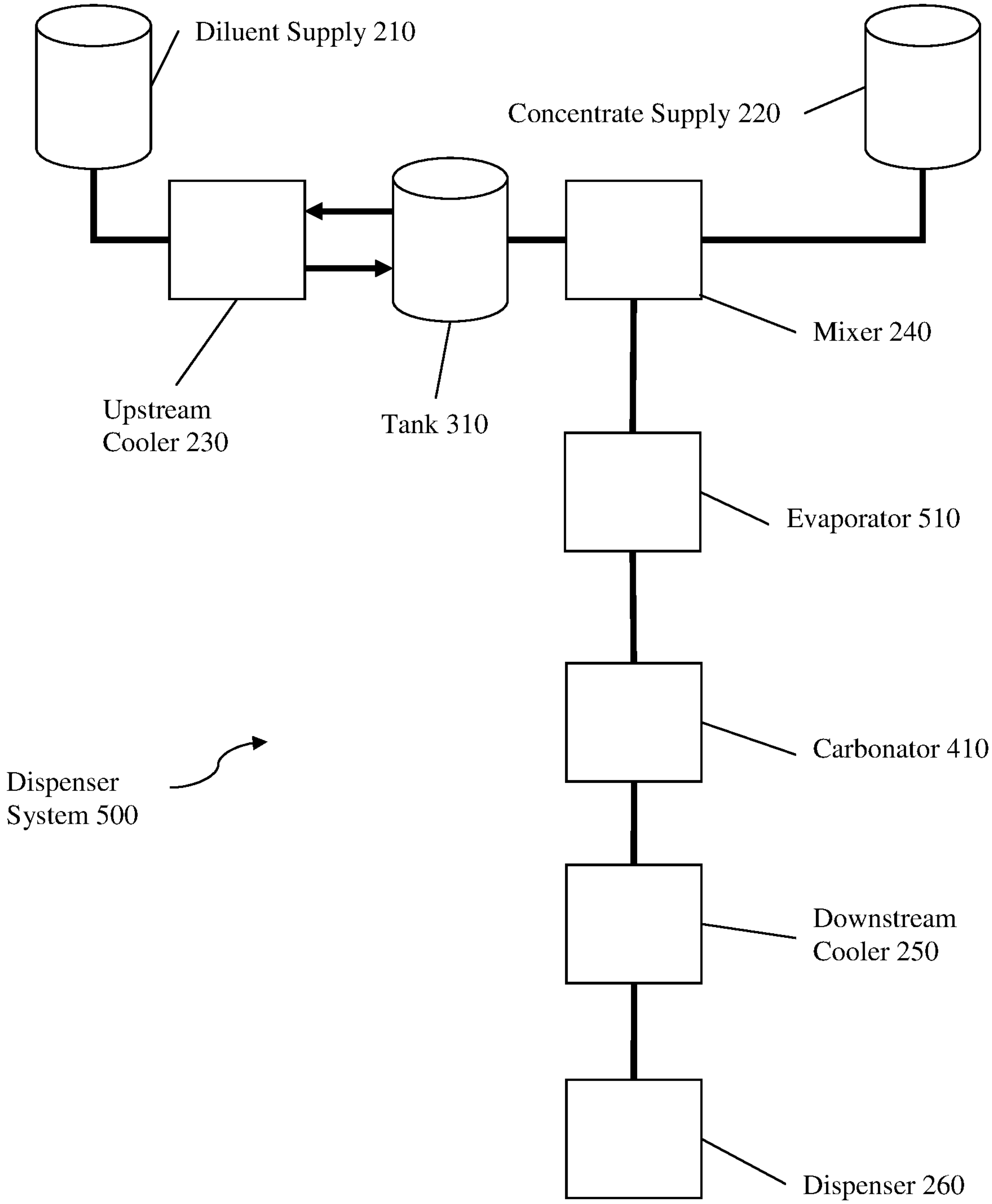
FIG. 5 is still another schematic of a device for dispensing a cooled beverage.

FIG. 5 illustrates another dispenser system 500. Dispenser system 500 is similar to dispenser system 400, but further includes evaporator 510 disposed between Mixer 240 and carbonator 410. All components having the same numbering as FIGS. 2, 3, and 4 are as described above. Evaporator 510 is configured to permit at least some gas to permeate out of the diluted solution, preferably via a selectively permeable or a semi-permeable membrane or material.

Figure 6:
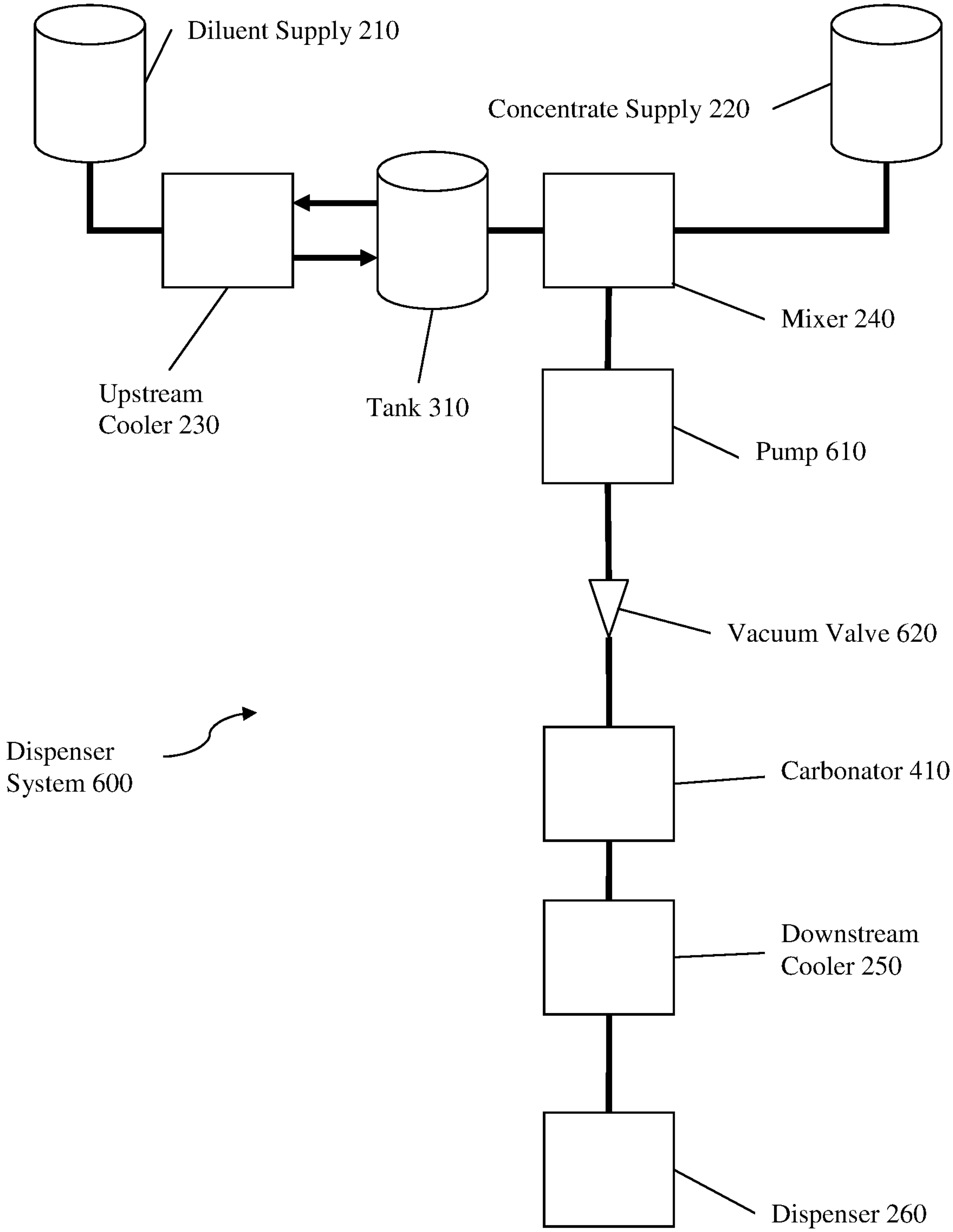
FIG. 6 is a further schematic of a device for dispensing a cooled beverage.

FIG. 6 illustrates another dispenser system 600. Dispenser system 600 is similar to dispenser system 400, but further includes pump 610 and vacuum valve 620, which are disposed between mixer 240 and carbonator 410. All components having the same numbering as FIGS. 2, 3, and 4 are as described above.

Pump 610 is fluidly disposed downstream of mixer 240. Pump 610 is suitable for pumping fluids. When pump 610 is activated, it draws the diluted solution from mixer 240 and propels the diluted solution downstream, through vacuum valve 620, and into carbonator 410.

Vacuum valve 620 is disposed downstream of pump 610 and is configured to permit a flow of pressurized diluted solution from pump 610 to pass through vacuum valve 620 and into carbonator 410, but does not permit a flow of fluid from carbonator 410 toward pump 610. Viewed from another perspective, when pump 610 is not activated the contents of carbonator 410 will be at a pressure greater than diluted solution upstream of carbonator 410. Vacuum valve 620 is configured to prevent an upstream flow of the pressurized contents of carbonator 410.

Figure 7:
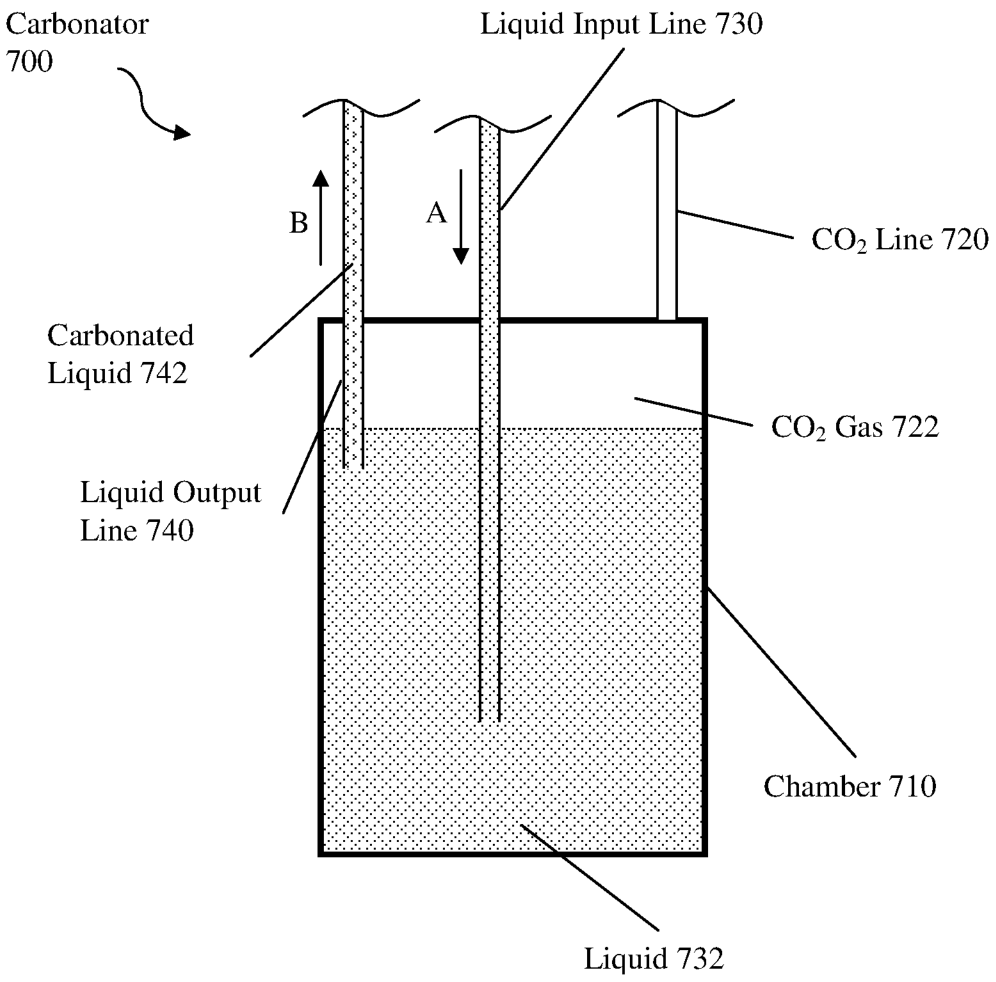
FIG. 7 depicts a carbonator for use in dispensing a cooled beverage.

FIG. 7 illustrates a carbonator 700, which can be included in the above dispenser systems. Carbonator 700 includes chamber 710, $CO_2$ line 720, liquid input line 730, and liquid output line 740. Chamber 710 is a closed structure having an internal space to hold pressurized fluids, and can contain fluids at pressures of at least 100 psi, 120 psi, 140 psi, 160 psi, 180 psi, 200 psi, 250 psi, or 300 psi. As depicted in FIG. 7, chamber 710 contains $CO_2$ gas 722 and liquid 732.

$CO_2$ line 720 is fluidly coupled to chamber 710 and, not depicted, a source of $CO_2$ gas. $CO_2$ line 720 provides pressurized $CO_2$ to chamber 710. Some embodiments further comprise a pump to pressurize the $CO_2$, but the $CO_2$ can also be pre-pressurized and available from a pressurized tank. As depicted, $CO_2$ line 720 delivers $CO_2$ gas 722 at a point towards the top of chamber 710. It is contemplated that $CO_2$ line 720 deliver $CO_2$ gas 722 at any point of chamber 710, including the sides, bottom, or areas where the volume of chamber 710 is already occupied by liquid 732. In some embodiments, $CO_2$ line 720 delivers $CO_2$ gas to chamber 710 via a diffuser (e.g., stone carbonator, etc.) positioned towards the bottom of chamber 710.

Liquid input line 730 provides a flow of liquid 732 in the direction of arrow A into chamber 710. It is contemplated that liquid 732 be any liquid solution as described herein, preferably a diluted solution. As depicted, liquid input line 730 delivers liquid 732 to chamber 710 towards a portion of the chamber away from an interface between liquid 732 and $CO_2$ gas 722. In some embodiments, the distance between the delivery point of liquid 732 from liquid input line 730 and the interface between liquid 732 and $CO_2$ gas 722 is at least 30%, 40%, or 50% the height of chamber 710, preferably 60%, 70%, or 75%, and more preferably 80%, 85%, or 90%.

Liquid output line 740 draws carbonated liquid 742 from chamber 710 in the direction of arrow B. As depicted, liquid output line 740 draws carbonated liquid 742 from a point near the interface of $CO_2$ gas 722 and liquid 732. In some embodiments, the distance between the withdrawal point of carbonated liquid 742 and the interface between liquid 732 and $CO_2$ gas 722 is no more 2%, 5%, 10%, or 15% the height of chamber 710.

It is contemplated that the configuration of the delivery point of liquid input line 730 and withdrawal point of liquid output line 740 may be reversed. For example, it is contemplated that the distance between the withdrawal point of carbonated liquid 742 and the interface between liquid 732 and $CO_2$ gas 722 is at least 30%, 40%, or 50% the height of chamber 710, preferably 60%, 70%, or 75%, and more preferably 80%, 85%, or 90%. It is also contemplated that the distance between the delivery point of liquid 732 from liquid input line 730 and the interface between liquid 732 and $CO_2$ gas 722 is no more 2%, 5%, 10%, or 15% the height of chamber 710.

Another inventive subject matter includes a method of dispensing a cooled beverage. FIG. 1 depicts flow chart 100 of one embodiment of the method. In this embodiment, the method begins with mixing step 110, followed by carbonating step 120, cooling step 130, and dispensing step 140.

In mixing step 110, a diluent and a concentrate are mixed to make a diluted solution. The diluent and concentrate can be mixed in any ratio desired by a user. It is contemplated that some diluted solutions comprise a 100:1 of diluent: concentrate ratio, but ratios of about 80:1, 60:1, 40:1, 30:1, 20:1, 15:1, 10:1, 8:1, 7:1, 6:1, 5.4:1, 5:1, 4.5:1, 4:1, 3.5:1, 3:1, 2.5:1, 2:1, 1.5:1, and 1:1 of diluent:concentrate, as well as inverse ratios, are contemplated. The concentrate and diluent are as described above.

A number of optional steps can be performed before, during, or after mixing step 110, but before carbonating step 120, including evaporating step 112, additive step 114, pumping step 116, valve step 118, and pre-cooling step 150. In evaporating step 112, an evaporator as described above is used to remove gas from the diluted solution.

In additive step 114, an additive (e.g., a scent, a thickener, a stabilizer, a flavor, a color, etc.) is added to the diluent or the concentrate during mixing step 110, or to the diluted solution before mixing step 110. Stabilizers include compounds effective at freezing-point depression (e.g., propylene glycol, glycerol, calcium chloride, sugar, dextrose, other suitable sugars, corn syrup, etc.). Thickeners include arrowroot, cornstarch, katakuri starch, potato starch, sago, tapioca, alginin, guar gum, locust bean gum, xantham gum, collagen, furcellaran, gelatin, agar, and carrageenan. Color additives include any commercially available food dyes. It is contemplated that additive step 114 is optionally applied to any of the steps of flow chart 100.

In pumping step 116, a mixer is used to perform the step of mixing, and a pump is disposed downstream of the mixer and used to pump the diluted solution into a carbonator. The mixer and pump can be as described above. In valve step 118, a vacuum valve as described above is fluidly disposed between a pump and the carbonator.

In pre-cooling step 150, the diluent is cooled by any suitable means as described above before it is mixed with the concentrate. Optionally, pre-cooling step 150 can include storing step 154, where the pre-cooled diluent is stored in a tank. In this step, the tank can be insulated to impede the flow of heat into or out of the tank. Pre-cooling step 150 can also include recirculating step 152, where the diluent is recirculated between a storage tank and a cooling system. Recirculating step 152 helps maintain the diluent at a temperature below 25° C., preferably below 15° C., or more preferably below 10° C. In some embodiments, recirculating step 152 helps maintain the diluent at a temperature between 0° C. and 5° C.

Carbonating step 120 follows mixing step 110, and any optional steps described above. In carbonating step 120, the diluted solution is carbonated to make a carbonated solution. Appropriate carbonators are as described above. In some embodiments where either the concentrate or the diluted solution is low in sugar content or sugar free, it is contemplated that carbonating step 120 comprise pressurizing the carbonator to at least 100 psi, 120 psi, 140 psi, 160 psi, 180 psi, 200 psi, 250 psi, or 300 psi.

Carbonating step 120 optionally further comprises cooling step 122. In cooling step 122, the diluted solution is cooled while resident in the carbonator. The carbonator and diluted solution may be cooled by suitable means as described above.

Cooling step 130 follows carbonating step 120, and any optional steps described above. In cooling step 130 the carbonated solution is cooled to below 0° C. to make the cooled beverage. In some embodiments where either the concentrate or the diluted solution is low in sugar content or sugar free, cooling step 130 can include pressurizing the solution being cooled to at least 100 psi, 120 psi, 140 psi, 160 psi, 180 psi, 200 psi, 250 psi, or 300 psi. A number of optional steps can be performed before, during, or after cooling step 130, including carbonator cooling step 132, pre-dispensing cooling step 134, or sensing step 136.

In carbonator cooling step 132, the carbonated solution is passed through a cold plate, with the same cold plate also used to cool the carbonator. In pre-dispensing cooling step 134, the carbonated solution is passed through a cold plate, and the step immediately precedes dispensing step 140. In sensing step 136, the temperature of the carbonated solution is sensed while the carbonated solution is resident in a cold plate. Cooling step 130, carbonator cooling step 132, pre-dispensing cooling step 134, and sensing step 136 may include other suitable cooling means as described above.

In preferred embodiments, sensing step 136 is used in conjunction with either carbonator cooling step 132 or pre-dispensing cooling step 134 to modify the temperature of the cold plate in response to the temperature of the carbonated solution. Viewed from another perspective, if the temperature of the carbonated solution deviates by more than 5° C., more preferably 3° C., from a desired temperature, about 0° C., the temperature of the cold plate is adjusted to heat or cool the carbonated beverage to within 5° C., more preferably 3° C.

Dispensing step 140 follows cooling step 130, and any optional steps described above. In dispensing step 140, the cooled beverage is dispensed through a nozzle. As an alternative to a nozzle, the cooled beverage may be dispensed via a tap, a spout, a soda gun, a draft arm, or other suitable means. In some embodiments where either the concentrate or the diluted solution is low in sugar content or sugar free, the dispensing step 140 can include pressurizing the solution being dispensed to at least 100 psi, 120 psi, 140 psi, 160 psi, 180 psi, 200 psi, 250 psi, or 300 psi. Dispensing step 140 can further include subzero dispensing step 142, where the cooled beverage is dispensed through the nozzle at a temperature below 0° C.

Descriptions throughout this document include information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A device for dispensing a liquid beverage comprising a diluent having a freezing point at STP, the device comprising:

an upstream cooler that pre-cools a supply of the diluent to a temperature above the freezing point to thereby produce a pre-cooled diluent;

a tank sized and dimensioned to temporarily hold the pre-cooled diluent;

a first coupling between the upstream cooler and the tank configured to permit flow of the pre-cooled diluent from the upstream cooler to the tank;

a second coupling between the upstream cooler and the tank configured to permit flow of a first portion of the pre-cooled diluent from the tank to the upstream cooler;

a mixer configured to mix a second portion of the pre-cooled diluent with a concentrate to make a diluted solution;

a downstream cooler that cools the diluted solution to below the freezing point to make a downstream-cooled solution;

a carbonator fluidly disposed between the mixer and the downstream cooler, the carbonator comprising (i) a liquid input line having an end that terminates near a bottom of the carbonator and (ii) a liquid output line having an end that terminates near a top of the carbonator; and a dispenser that dispenses the downstream-cooled solution to the atmosphere, as the liquid beverage at a temperature that is below the freezing point.

2. The device of claim 1, wherein the carbonator is cooled by the downstream cooler.

3. The device of claim 1, wherein the carbonator is cooled by an intermediate cooler.

4. The device of claim 1, wherein the downstream cooler comprises a cold plate.

5. The device of claim 1, further comprising electronics that maintains the liquid beverage dispensed through the dispenser within a temperature range of no more than ±3° C.

6. The device of claim 1, further comprising a pump configured to drive at least one of the diluent, the pre-cooled diluent, the diluted solution, or the downstream-cooled solution through the device.

7. The device of claim 6, wherein the diluted solution is pumped to the carbonator upon activation of the dispenser.

8. The device of claim 6, further comprising a vacuum valve disposed between the pump and the carbonator.

9. The device of claim 1, further comprising an evaporator configured to remove gas from the diluted solution.

10. The device of claim 1, wherein the pre-cooled diluent resides in the tank until the dispenser is activated.

11. The device of claim 1, wherein each of the diluent, the diluted solution, and the downstream-cooled solution are in a liquid state.

* * * * *